US011033961B2

(12) United States Patent
She et al.

(10) Patent No.: US 11,033,961 B2
(45) Date of Patent: Jun. 15, 2021

(54) MATERIAL AND PROCESSES FOR ADDITIVELY MANUFACTURING ONE OR MORE PARTS

(71) Applicant: United Technologies Corporation, Farmington, CT (US)

(72) Inventors: Ying She, East Hartford, CT (US); Aaron T. Nardi, East Granby, CT (US); Zissis A. Dardas, Worcester, MA (US); Michael A. Klecka, Coventry, CT (US); Scott A. Eastman, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 607 days.

(21) Appl. No.: 15/105,100

(22) PCT Filed: Jan. 9, 2015

(86) PCT No.: PCT/US2015/010836
§ 371 (c)(1),
(2) Date: Jun. 16, 2016

(87) PCT Pub. No.: WO2015/106113
PCT Pub. Date: Jul. 16, 2015

(65) Prior Publication Data
US 2017/0043395 A1    Feb. 16, 2017

Related U.S. Application Data

(60) Provisional application No. 61/925,466, filed on Jan. 9, 2014.

(51) Int. Cl.
*B22F 1/02* (2006.01)
*B22F 1/00* (2006.01)
(Continued)

(52) U.S. Cl.
CPC .............. *B22F 1/02* (2013.01); *B22F 1/0059* (2013.01); *B22F 1/0062* (2013.01); *B22F 3/003* (2013.01);
(Continued)

(58) Field of Classification Search
CPC ........ B22F 1/0059; B22F 1/0062; B22F 1/02; B22F 3/1021; B22F 3/1055;
(Continued)

(56) References Cited

U.S. PATENT DOCUMENTS 5,639,402 A    6/1997 Barlow et al.
5,678,162 A    10/1997 Barlow et al.
(Continued)

FOREIGN PATENT DOCUMENTS

CN    102581274        7/2012
CN    102581274 A  *  7/2012
(Continued)

OTHER PUBLICATIONS

Extended EP Search Report dated Feb. 6, 2017.
EP office action for EP15735034.9 dated Mar. 25, 2019.

*Primary Examiner* — Vanessa T. Luk
(74) *Attorney, Agent, or Firm* — Getz Balich LLC

(57) ABSTRACT

Material is provided for forming a part using a manufacturing system. The material includes a plurality of discrete particles. Each of the particles includes a metal powder core encapsulated by a non-metal coating. At least the cores of the particles are adapted to be solidified together by the manufacturing system to form the part.

20 Claims, 3 Drawing Sheets

(51) Int. Cl.
  *B33Y 70/00* (2020.01)
  *B22F 10/10* (2021.01)
  *B22F 12/00* (2021.01)
  *B23K 26/342* (2014.01)
  *B22F 3/00* (2021.01)
  *B22F 3/10* (2006.01)
  *B23K 15/00* (2006.01)
  *B23K 26/00* (2014.01)
  *B23K 103/04* (2006.01)
  *B23K 103/10* (2006.01)
  *B23K 103/12* (2006.01)
  *B23K 103/14* (2006.01)
  *B23K 103/16* (2006.01)
  *B23K 103/00* (2006.01)
  *B33Y 10/00* (2015.01)

(52) U.S. Cl.
  CPC ............ B22F 3/1017 (2013.01); B22F 12/00 (2021.01); B23K 15/0086 (2013.01); B23K 15/0093 (2013.01); B23K 26/0006 (2013.01); B23K 26/342 (2015.10); B33Y 70/00 (2014.12); *B22F 10/10* (2021.01); *B22F 2301/052* (2013.01); *B22F 2301/10* (2013.01); *B22F 2301/15* (2013.01); *B22F 2301/205* (2013.01); *B22F 2302/20* (2013.01); *B22F 2302/45* (2013.01); *B22F 2998/10* (2013.01); *B23K 2103/04* (2018.08); *B23K 2103/10* (2018.08); *B23K 2103/12* (2018.08); *B23K 2103/14* (2018.08); *B23K 2103/16* (2018.08); *B23K 2103/42* (2018.08); *B23K 2103/52* (2018.08); *B33Y 10/00* (2014.12); *Y02P 10/25* (2015.11)

(58) Field of Classification Search
  CPC ............ B22F 2301/052; B22F 2301/10; B22F 2301/15; B22F 2301/205; B22F 2301/35; B22F 2303/20; B22F 2303/25; B22F 2303/30; B22F 3/105; B29C 64/153; B33Y 70/00; B33Y 70/10
  See application file for complete search history.

(56) References Cited

U.S. PATENT DOCUMENTS

| | | | |
|---|---|---|---|
| 5,749,041 A | 5/1998 | Lakshminarayan et al. | |
| 6,048,954 A * | 4/2000 | Barlow | B29C 64/165 526/328.5 |
| 6,676,892 B2 * | 1/2004 | Das | B22F 3/1055 419/7 |
| 6,972,115 B1 * | 12/2005 | Ballard | B01J 19/088 422/186.04 |
| 7,045,738 B1 | 5/2006 | Kovacevic et al. | |
| 7,777,155 B2 | 8/2010 | Twelves, Jr. et al. | |
| 7,789,037 B2 | 9/2010 | Teulet | |
| 8,383,985 B2 | 2/2013 | Twelves, Jr. et al. | |
| 8,460,755 B2 | 6/2013 | Rodgers | |
| 8,488,994 B2 | 7/2013 | Hanson et al. | |
| 2002/0015654 A1 | 2/2002 | Das et al. | |
| 2003/0175411 A1 * | 9/2003 | Kodas | H01G 4/1227 427/58 |
| 2004/0191106 A1 * | 9/2004 | O'Neill | A61F 2/30907 419/2 |
| 2006/0101713 A1 | 5/2006 | Hahma | |
| 2006/0159896 A1 * | 7/2006 | Pfeifer | B22F 3/1055 428/206 |
| 2006/0211802 A1 * | 9/2006 | Asgari | A61L 27/04 524/439 |
| 2006/0251535 A1 | 11/2006 | Pfeifer | |
| 2009/0200275 A1 | 8/2009 | Twelves, Jr. et al. | |
| 2011/0076587 A1 * | 3/2011 | Wang | B22F 1/0088 429/465 |
| 2012/0164322 A1 | 6/2012 | Teulet | |
| 2012/0228807 A1 | 9/2012 | Teulet | |
| 2013/0011660 A1 * | 1/2013 | Diekmann | B29C 67/04 428/323 |
| 2013/0039799 A1 * | 2/2013 | Bono | B60J 7/202 419/38 |
| 2013/0277891 A1 | 10/2013 | Teulet | |
| 2014/0314964 A1 * | 10/2014 | Ackelid | B05D 3/068 427/496 |
| 2016/0279703 A1 | 9/2016 | Clare | |

FOREIGN PATENT DOCUMENTS

| | | |
|---|---|---|
| JP | 02046703 | 2/1990 |
| KR | 100889256 | 3/2009 |
| WO | 9530503 | 11/1995 |

* cited by examiner

MATERIAL AND PROCESSES FOR ADDITIVELY MANUFACTURING ONE OR MORE PARTS

CROSS-REFERENCE TO RELATED APPLICATIONS

This application claims priority to PCT Patent Application No. PCT/US2015/010836 filed Jan. 9, 2015, which claims priority to U.S. Provisional Application Ser. No. 61/925,466 filed Jan. 9, 2014, which are hereby incorporated herein by reference in their entireties.

BACKGROUND OF THE INVENTION

1. Technical Field

This disclosure relates to material and processes for additive manufacturing one or more parts.

2. Background Information

Various additive manufacturing processes are known in the art for forming one or more parts. The term "additive manufacturing" may describe a process where a part or parts are formed by accumulating and/or fusing material together, typically in a layer-on-layer manner. Layers of material, for example, may be cold sprayed sequentially onto one another to form the part(s). In another example, layers of material may be sintered or otherwise melted sequentially onto one another to form the part(s).

Part(s) are typically additively manufactured from metal powder. This metal powder may be degassed in order to remove entrained gasses and/or moisture therefrom, which if not removed can create various defects within the part(s). However, if the degassed metal powder is exposed to air or atmosphere containing residual moisture during storage and/or loading into an additive manufacturing system, the degassed metal powder may re-adsorb moisture. The metal powder therefore may require additional degassing, which can increase manufacturing time and cost.

There is a need in the art for improved additive manufacturing materials and processes.

SUMMARY OF THE DISCLOSURE

According to an aspect of the invention, material is provided for forming a part using a manufacturing system. This material includes a plurality of discrete particles. Each of the particles includes a metal powder core encapsulated by a non-metal coating. At least the cores of the particles are adapted to be solidified together by the manufacturing system to form the part.

According to another aspect of the invention, another material is provided for forming a part using an additive manufacturing system. This material includes a plurality of discrete particles. Each of the particles includes a coating on a degassed metal powder core. The coating is adapted to prevent the core from adsorbing moisture. The coating is also adapted to decompose and/or volatize to expose the core. The cores of the particles are adapted to be solidified together by the additive manufacturing system to form the part.

According to another aspect of the invention, a process is provided for forming a part using an additive manufacturing system. A plurality of discrete particles are provided. Each of these particles includes a metal powder core encapsulated by a non-metal coating. At least some of the cores are solidified together using the additive manufacturing system to form at least a portion of the part.

The manufacturing system may be an additive manufacturing system.

The metal powder core of at least one of the particles may be a degassed metal powder core.

The coating of at least one of the particles may be adapted to prevent the core from adsorbing moisture.

The coating of at least one of the particles may be adapted to decompose and/or volatize to expose the core.

The coating of at least one of the particles may be configured from or otherwise include polymer. The coating of at least one of the particles may also or alternatively be configured from or otherwise include ceramic.

The coating of at least one of the particles may be configured from or otherwise include at least one of the following materials: alkoxysilane, aminosilane, organic phospholic acid, nitride, fluoride, epoxy, thiol, disulphide, thoilate, triazol, alkylphosphonic acids, fluoropolymers, silicones, polypyrrol, polyanyline, and other polymeric assembled monolayers.

The core of at least one of the particles may include a single metal particle. In addition or alternatively, the core of at least one of the particles may include a plurality of metal particles.

The core of at least one of the particles may be configured from or otherwise include at least one of the following materials: aluminum, copper, titanium, nickel and steel.

The coating of at least some of the particles may be removed to expose the cores of the respective particles. The coating may be removed through decomposition and/or volatization.

The additive manufacturing system may include a cold spray device.

The additive manufacturing system may include a laser and/or an electron beam energy source.

The foregoing features and the operation of the invention will become more apparent in light of the following description and the accompanying drawings.

DETAILED DESCRIPTION OF THE INVENTION

Figure 1:
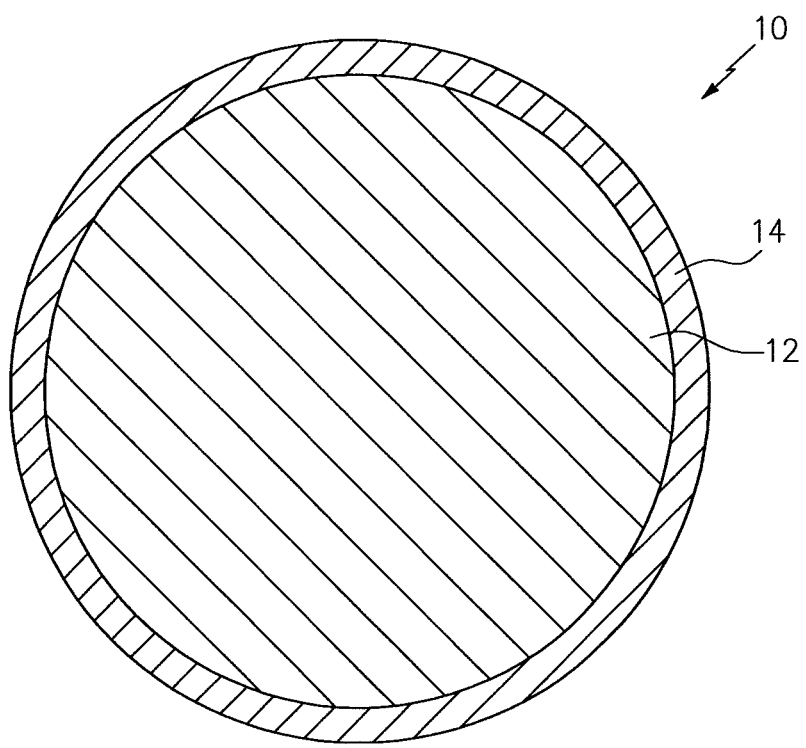
FIG. 1 is cross-sectional illustration of an additive manufacturing particle.

Material is described below for additively manufacturing one or more parts. This additive manufacturing material includes a plurality of discrete particles that collectively form powder. An exemplary of one of these additive manufacturing particles 10 is illustrated in FIG. 1 and described below. It is worth noting, however, that one or more of the additive manufacturing particles included in the additive manufacturing material may alternatively have different configurations and/or compositions than that described below and illustrated in FIG. 1.

The additive manufacturing particle 10 of FIG. 1 includes a metal powder core 12 covered and/or encapsulated by a coating 14. The core 12 may include one or more metal particles. Each of these metal particles may be composed from one or more of the following core materials: aluminum (Al), copper (Cu), titanium (Ti), nickel (Ni), steel, and/or alloys thereof. One or more of the metal particles, of course, may also or alternatively be composed from one or more core materials other than those described above.

The core 12 may be a degassed metal powder core. For example, before being encapsulated within the coating 14, the core 12 may be degassed to remove entrained gas, adsorbates and/or moisture therefrom. Various degassing processes are known in the art and therefore are not described in further detail.

The core 12 may have a size (e.g., an average diameter) of between about five micrometers (5 μm) and about five-hundred micrometers (500 μm); e.g., between about twenty micrometers (20 μm) and about sixty micrometers (60 μm). The present invention, however, is not limited to the foregoing exemplary core sizes.

The coating 14 is adapted to substantially reduce or prevent the core 12 from adsorbing moisture. The coating 14 therefore may enable the additive manufacturing particle 10 to be stored outside of a controlled additive manufacturing environment (e.g., a vacuum or noble gas environment) without compromising the core material for subsequent additive manufacturing. In contrast, a metal particle without such a coating may adsorb moisture during the storage and/or transportation thereof. This moisture may subsequently cause surface defects and/or porosity defects in a part formed from the now non-degassed metal particle.

Referring again to FIG. 1, the coating 14 may also be adapted to partially or substantially completely decompose and/or volatize in order to partially or substantially completely expose the core 12 for subsequent additive manufacturing. In this manner, the coating 14 may be removed from the core 12 prior to formation of the part(s), which reduces the likelihood of or substantially prevents the coating material from altering the mechanical properties and/or the intended chemical composition of the part(s).

The coating 14 may be a non-metal coating such as, for example, a polymer coating, a ceramic coating, a polymer-ceramic coating, or any other type of coating that does not include a metal component and is adapted as described above. The coating 14, for example, may be composed from one or more of the coating materials listed below in Table I. The coating 14, however, may also or alternatively be composed of one or more coating materials other than those described above and listed in Table I.

TABLE I

| Core Representative | Coating | |
| --- | --- | --- |
| Metal Core Material | Chemical Class(es) | Representative Non-Metal Coating Material(s) |
| Aluminum | Alkoxysilane | Triethoxy silane |
| | Aminosilane | Aminopropyldimethylethoxysilane |
| | Organic phospholic acid | Pentanephosphonic acid |
| | Nitride | Nitrogen (e.g., $N_2$) |
| | Fluoride | Fluorocarbon |
| | Epoxy | |
| | Organic vapor coating | Paralene, cyanoacrylate |
| Copper | Thiol, disulphide, thiolate | Organic thiol |
| | Triazol | Benzenetriazole (BTA) |
| | Organic vapor coating | Paralene, cyanoacrylate |
| | Inorganic vapor coating | Silane |
| Titanium | Inorganic vapor | Titanium nitride |

TABLE I-continued

| Core Representative | Coating | |
| --- | --- | --- |
| Metal Core Material | Chemical Class(es) | Representative Non-Metal Coating Material(s) |
| | coating | |
| | Chemisorption | Fluorinated polymers |
| Nickel | Chemisorption | Alkylphosphonic acids |
| Steel | Electropolymerization | Polypyrrol/polyaniline |

The coating material may be deposited on the core 12 to form the coating 14 through one or more of the following processes: chemical adsorption, physical adsorption and/or covalent bonding. Various chemical adsorption, physical adsorption and covalent bonding processes are known in the art and therefore are not described in further detail. The coating material, of course, may also or alternatively be deposited on the core 12 using one or more processes other than those described above.

Figure 2:
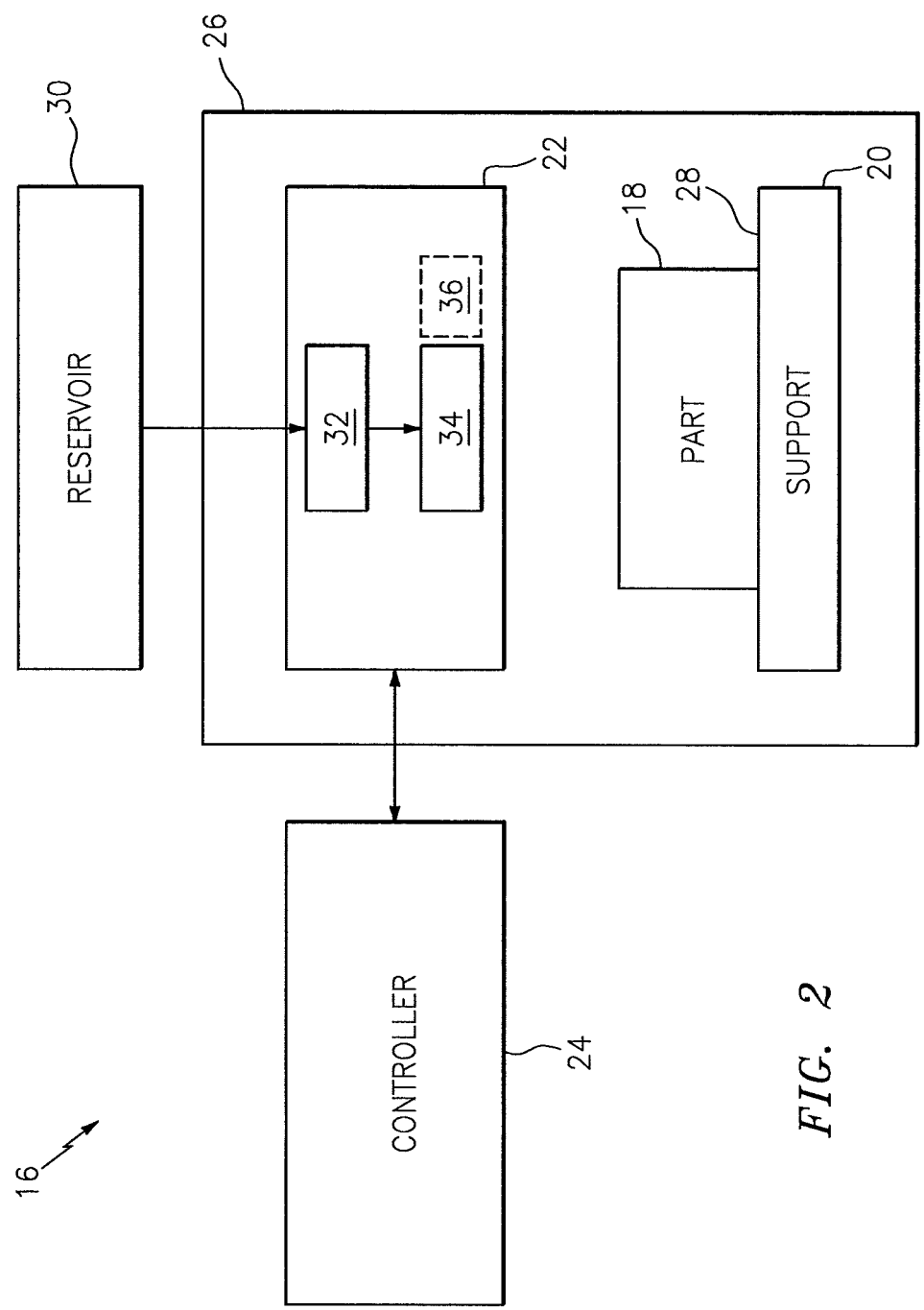
FIG. 2 is a block diagram of a system for additively manufacturing one or more parts.

FIG. 2 illustrates a system 16 for additively manufacturing a part 18 (or parts) from the additive manufacturing material (e.g., powder) describe above. This additive manufacturing system 16 includes a support 20, an additive manufacturing device 22 and a controller 24. The additive manufacturing system 16 also includes a housing 26, such as a sealed enclosure or pressure vessel, in which the support 20 and at least a portion of the additive manufacturing device 22 are located.

The support 20 includes a support surface 28. This support surface 28 is configured to support the additive manufacturing material and/or at least a portion of the part 18 (or parts) during the formation of the part 18 (or parts). The support surface 28, for example, may be substantially horizontal relative to gravity. The support surface 28 may also have a generally planar geometry.

The additive manufacturing device 22 may be configured as a cold spray device, a laser sintering device, or an electron beam melting device. Various cold spray devices, laser sintering devices and electron beam melting devices are known in the art and therefore are not described in further detail. In addition, various other types and configurations of additive manufacturing devices are known in the art and the present invention is not limited to any particular ones thereof.

The controller 24 is in signal communication (e.g., hard-wired and/or wirelessly coupled) with the additive manufacturing device 22. The controller 24 is adapted to signal the additive manufacturing device 22 to perform at least a portion of the process described below. The controller 24 is implemented with a combination of hardware and software. The hardware includes memory and a processing device (or system), which includes one or more single-core and/or multi-core processors. The memory may be a non-transitory computer readable medium, and configured to store software (e.g., program instructions) for execution by the processing device. The hardware may also or alternatively include analog and/or digital circuitry other than that described above.

Figure 3:
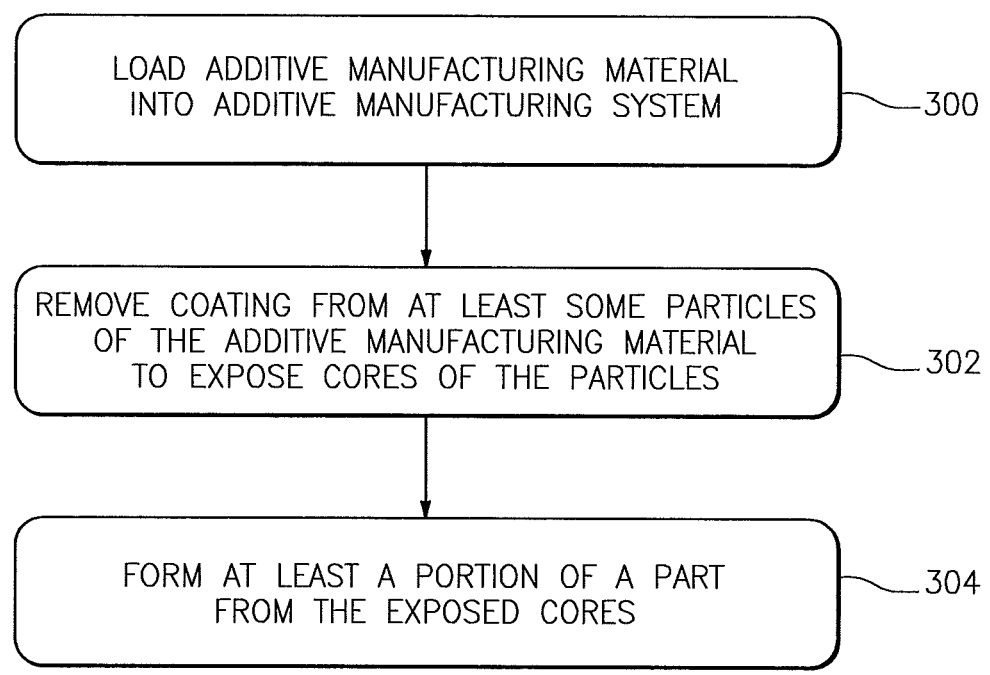
FIG. 3 is a flow diagram of a process for forming one or more parts using the additive manufacturing system of FIG. 2 and material including the additive manufacturing particle of FIG. 1.

FIG. 3 is a flow diagram of a process for forming a part 18 (or parts) using the additive manufacturing material and the additive manufacturing system 16. An example of a part that may be formed with the additive manufacturing system 16 is a rotor blade for a turbine engine; e.g., a turbine blade, a compressor blade or a fan blade. Other examples of a part that may be formed with the additive manufacturing system 16 include a stator blade for a turbine engine, a guide vane for a turbine engine, a gas path wall for a turbine engine as well as various other components included in a turbine engine. The process of FIG. 3 and the additive manufacturing system 16, of course, may also or alternatively form parts other than those included in a turbine engine.

Prior to the formation of the part 18 (or parts), the additive manufacturing material may be stored in an ambient environment outside of the additively manufacturing system 16. Alternatively, the additive manufacturing material may be stored in a controlled environment (e.g., a vacuum or noble gas environment) and/or in a reservoir 30 (e.g., a hopper) of the additive manufacturing system 16.

In step 300, the additive manufacturing material is loaded into the additive manufacturing system 16. The additive manufacturing material, for example, may be poured out or otherwise directed from its storage container into the reservoir 30, which may selectively feed the material to the additive manufacturing device 22.

In step 302, the coating 14 is removed from at least some of the additive manufacturing particles (e.g., particle 10) to expose the core material; e.g., the degassed metal powder cores. For example, a conduit and/or a chamber 32 configured with the additive manufacturing device 22 may be heated with a heater to or above an elevated (e.g., above ambient) temperature at which the coating material decomposes and/or volatizes. This conduit and/or chamber 32 may be connected upstream of a material applicator 34 (e.g., a powder bed nozzle or a cold spray nozzle) of the additive manufacturing device 22. The material applicator 34 therefore may receive the exposed core material (e.g., the degassed metal powder cores) from the conduit and/or chamber 32.

In step 304, at least some of the exposed core material is formed into at least a portion of the part 18 (or parts). The material applicator 34, for example, may cold spray the exposed core material onto the support surface 28 to build up a base layer. The material applicator 34 may subsequently cold spray one or more additional layers of the exposed core material onto the base layer to accumulatively form the part 18 (or parts). As each layer of material is cold sprayed, it may fuse to a previously sprayed layer thereby solidifying at least some of the metal powder cores 12 together to form the part 18 (or parts).

In another example, the material applicator 34 may deposit a uniform and compacted layer of the exposed core material onto the support surface 28. A laser or electron beam energy source 36 may subsequently solidify (e.g., sinter or otherwise melt) some or all of the metal powder cores 12 in the layer together to form a base layer of the part 18 (or parts). The material applicator 34 may subsequently deposit one or more additional uniform and compacted layers of the exposed core material onto the base layer, and the laser or electron beam energy source 36 may respectively solidify some or all of the metal powder cores 12 in the additional layer(s) to form additional layers of the part 18 (or parts). Of course, the process of FIG. 3 is not limited to the foregoing exemplary material buildup techniques or devices.

One or more of the process steps of FIG. 3 may be omitted, re-arranged and/or combined. For example, in some embodiments, the additive manufacturing material may be stored with the additive manufacturing system 16. In some embodiments, the coating 14 may be removed within the material applicator 34 and/or as the additive manufacturing particles (e.g., particle 10) are directed from the material applicator 34 towards the support surface 28. In some embodiments, the coating material may not be removed from the particles (e.g., particle 10) where, for example, the coating material does not substantially affect the chemical composition and/or mechanical properties of the part 18 (or parts) formed therefrom.

The process of FIG. 3 may include one or more additional steps other than those described above. For example, in some embodiments, the part 18 (or parts) may undergo additional manufacturing processes during and/or after the material buildup step 304. Examples of such additional manufacturing processes may include, but are not limited to, machining, surface finishing, coating, etc. In some embodiments, the part 18 (or parts) may also or alternatively undergo additional manufacturing processes before the material buildup step 304 where, for example, the additive manufacturing material is built up upon an existing part or portion of a part (or parts); e.g., to repair a part, etc.

While the material disclosed herein is described above with reference to additive manufacturing, this material may also or alternatively be used for other manufacturing processes. The material, for example, may be solidified together by a manufacturing system during casting, hot pressing, extruding, etc. The present invention therefore is not limited to any particular manufacturing processes or systems.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A process for forming a part using an additive manufacturing system, the process comprising:
   providing a plurality of discrete particles, each of the particles including a metal powder core encapsulated by a non-metal coating, wherein the non-metal coating comprises at least one of the following materials: alkoxysilane, aminosilane, organic phospholic acid, triazol, or alkylphosphonic acid; and
   solidifying at least some of the cores together using the additive manufacturing system to form at least a portion of the part.

2. A process for forming a part using an additive manufacturing system, the process comprising:
   providing a plurality of discrete particles, each of the particles including a metal powder core encapsulated by a non-metal coating, wherein the non-metal coating of one of the particles comprises at least one of the following materials: alkoxysilane, aminosilane, organic phospholic acid, triazol, or alkylphosphonic acid; and
   solidifying at least some of the cores together using the additive manufacturing system to form at least a portion of the part.

3. The process of claim 2, wherein the metal powder core of one of the particles comprises a degassed metal powder core.

4. The process of claim 2, wherein the coating of one of the particles is adapted to prevent the core from adsorbing moisture.

5. The process of claim 2, further comprising removing the coatings from at least some of the particles to expose the cores of the respective particles.

6. The process of claim 2, wherein the core of one of the particles includes one or more metal particles.

7. The process of claim 2, wherein the core of one of the particles comprises at least one of the following materials: aluminum, copper, titanium, nickel or steel.

8. The process of claim 2, wherein the additive manufacturing system comprises a cold spray device.

9. The process of claim 2, wherein the additive manufacturing system comprises one of a laser or an electron beam energy source.

10. The process of claim 2, wherein the non-metal coating of one of the particles comprises at least one of the following materials: the alkoxysilane, or the aminosilane.

11. The process of claim 2, wherein the non-metal coating of one of the particles comprises the triazol.

12. The process of claim 2, wherein the non-metal coating of one of the particles comprises the organic phospholic acid.

13. The process of claim 2, wherein the non-metal coating of one of the particles comprises the alkylphosphonic acid.

14. A process for forming a part using an additive manufacturing system that includes a material applicator, the process comprising:
providing a plurality of discrete particles, each of the particles including a metal powder core encapsulated by a non-metal coating, wherein the non-metal coating comprises at least one of the following materials: alkoxysilane, aminosilane, organic phospholic acid, triazol, or alkylphosphonic acid;
providing a plurality of exposed cores by removing the non-metal coating from each of the particles such that the respective core is exposed;
providing the exposed cores to the material applicator; and
forming at least a portion of the part using at least the material applicator, the forming comprising solidifying at least some of the exposed cores together.

15. The process of claim 14, wherein the core of one of the particles includes one or more metal particles.

16. The process of claim 14, wherein the core of one of the particles comprises at least one of the following materials: aluminum, copper, titanium, nickel or steel.

17. The process of claim 14, wherein the additive manufacturing system comprises a cold spray device.

18. The process of claim 14, wherein the additive manufacturing system comprises one of a laser or an electron beam energy source.

19. The process of claim 14, wherein the coating of one of the particles is adapted to volatize to expose the core.

20. The process of claim 14, wherein the non-metal coating comprises a polymer-ceramic coating.

\* \* \* \* \*